(12) United States Patent
Some (10) Patent No.: US 11,579,079 B2
(45) Date of Patent: Feb. 14, 2023

(54) DIFFERENTIAL REFRACTOMETER FOR GRADIENT CHROMATOGRAPHY

(71) Applicant: Wyatt Technology Corporation, Goleta, CA (US)

(72) Inventor: Daniel I. Some, Atlit (IL)

(73) Assignee: WYATT TECHNOLOGY CORPORATION, Goleta, CA (US)

( * ) Notice: Subject to any disclaimer, the term of this patent is extended or adjusted under 35 U.S.C. 154(b) by 20 days.

(21) Appl. No.: 17/383,426

(22) Filed: Jul. 22, 2021

(65) Prior Publication Data

US 2022/0026359 A1    Jan. 27, 2022

Related U.S. Application Data

(60) Provisional application No. 63/055,263, filed on Jul. 22, 2020.

(51) Int. Cl.
*G01N 21/41* (2006.01)
*G01N 21/53* (2006.01)

(52) U.S. Cl.
CPC ......... *G01N 21/4133* (2013.01); *G01N 21/53* (2013.01); *G01N 2021/4146* (2013.01)

(58) Field of Classification Search
CPC ............... G01N 21/4133; G01N 21/53; G01N 2021/4146; G01N 30/74; G01N 30/34
See application file for complete search history.

(56) References Cited

U.S. PATENT DOCUMENTS

2016/0018326 A1*    1/2016    Jeanotte ............. G01N 21/4133
                                                                                356/130

* cited by examiner

*Primary Examiner* — Hwa Andrew Lee
(74) *Attorney, Agent, or Firm* — Leonard T. Guzman (57) ABSTRACT

The present disclosure describes a differential refractometer for gradient chromatography. In an exemplary embodiment, the differential refractometer includes a solvent delay volume, an eluent flow meter coupled to an eluent inlet of a sample cell, a solvent flow regulator coupled to an outlet of the solvent delay volume and coupled to a solvent inlet of a reference cell, an instrument controller configured to receive the eluent flow rate from the eluent flow meter, configured to receive the solvent flow rate from the solvent flow regulator, configured to receive a flow rate ratio from a flow rate ratio data source, wherein the flow rate ratio indicates a ratio of the eluent flow rate to the solvent flow rate, and an optical bench configured to measure a difference between a refractive index of the eluent present in the sample cell and a refractive index of the solvent present in the reference cell.

4 Claims, 10 Drawing Sheets

DIFFERENTIAL REFRACTOMETER FOR GRADIENT CHROMATOGRAPHY

PRIORITY

This application claims priority to U.S. Provisional Patent Application No. 63/055,263, filed Jul. 22, 2020.

BACKGROUND

The present disclosure relates to differential refractometry, and more specifically, to a differential refractometer for gradient chromatography.

SUMMARY

The present disclosure describes a differential refractometer for gradient chromatography. In an exemplary embodiment, the differential refractometer includes (1) a solvent delay volume configured to be coupled to an outlet of a chromatography pump, (2) an eluent flow meter configured to be coupled to an outlet of a chromatography column and coupled to an eluent inlet of a sample cell, where the eluent flow meter is configured to measure an eluent flow rate of an eluent flowing through the sample cell, (3) a solvent flow regulator coupled to an outlet of the solvent delay volume and coupled to a solvent inlet of a reference cell, where the solvent flow regulator is configured to measure and to regulate a solvent flow rate of a solvent flowing through the reference cell, (4) an instrument controller configured to receive the eluent flow rate from the eluent flow meter, configured to receive the solvent flow rate from the solvent flow regulator, configured to receive a flow rate ratio from a flow rate ratio data source, wherein the flow rate ratio indicates a ratio of the eluent flow rate to the solvent flow rate, and configured to transmit a flow command to the solvent flow regulator to achieve the flow rate ratio, and (5) an optical bench configured to measure, in response to receiving from the instrument controller a signal indicating that the flow rate ratio has been achieved, a difference between a refractive index of the eluent present in the sample cell and a refractive index of the solvent present in the reference cell.

DETAILED DESCRIPTION

The present disclosure describes a differential refractometer for gradient chromatography. In an exemplary embodiment, the differential refractometer includes (1) a solvent delay volume configured to be coupled to an outlet of a chromatography pump, (2) an eluent flow meter configured to be coupled to an outlet of a chromatography column and coupled to an eluent inlet of a sample cell, where the eluent flow meter is configured to measure an eluent flow rate of an eluent flowing through the sample cell, (3) a solvent flow regulator coupled to an outlet of the solvent delay volume and coupled to a solvent inlet of a reference cell, where the solvent flow regulator is configured to measure and to regulate a solvent flow rate of a solvent flowing through the reference cell, (4) an instrument controller configured to receive the eluent flow rate from the eluent flow meter, configured to receive the solvent flow rate from the solvent flow regulator, configured to receive a flow rate ratio from a flow rate ratio data source, wherein the flow rate ratio indicates a ratio of the eluent flow rate to the solvent flow rate, and configured to transmit a flow command to the solvent flow regulator to achieve the flow rate ratio, and (5) an optical bench configured to measure, in response to receiving from the instrument controller a signal indicating that the flow rate ratio has been achieved, a difference between a refractive index of the eluent present in the sample cell and a refractive index of the solvent present in the reference cell. In an embodiment, the flow rate ratio is a ratio of a volume of a void in the chromatography column to a volume of a void in the solvent delay column. In an embodiment, the flow rate ratio is a ratio of a sum of a volume of a void in the chromatography column, a volume of tubing coupled to the chromatography column, and a volume of the eluent flow meter, to a sum of a volume of a void in the solvent delay column, a volume of tubing coupled to the solvent delay column, and a volume of the solvent flow regulator.

In an exemplary embodiment, the differential refractometer includes (1) a solvent delay volume configured to be coupled to an outlet of a chromatography pump, (2) an eluent flow meter configured to be coupled to an outlet of a chromatography column and coupled to an eluent inlet of a sample cell, where the eluent flow meter is configured to measure an eluent flow rate of an eluent flowing through the sample cell, (3) a solvent flow regulator coupled to an outlet of the solvent delay volume and coupled to a solvent inlet of a reference cell, where the solvent flow regulator is configured to measure and to regulate a solvent flow rate of a solvent flowing through the reference cell, and (4) an instrument controller configured to receive the eluent flow rate from the eluent flow meter, configured to receive the solvent flow rate from the solvent flow regulator, configured to receive a flow rate ratio from a flow rate ratio data source, wherein the flow rate ratio indicates a ratio of the eluent flow rate to the solvent flow rate, and configured to transmit a flow command to the solvent flow regulator to achieve the flow rate ratio. In a further embodiment, the differential refractometer further includes an optical bench configured to measure, in response to receiving from the instrument controller a signal indicating that the flow rate ratio has been achieved, a difference between a refractive index of the eluent present in the sample cell and a refractive index of the solvent present in the reference cell. In an embodiment, the flow rate ratio is a ratio of a volume of a void in the chromatography column to a volume of a void in the solvent delay column. In an embodiment, the flow rate ratio is a ratio of a sum of a volume of a void in the chromatography column, a volume of tubing coupled to the chromatography column, and a volume of the eluent flow meter, to a sum of a volume of a void in the solvent delay column, a volume of tubing coupled to the solvent delay column, and a volume of the solvent flow regulator.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Concentration Detector

Differential Refractive Index Detector

A differential refractive index detector (dRI), or differential refractometer, or refractive index detector (RI or RID), is a detector that measures the refractive index of an analyte relative to the solvent. They are often used as detectors for high-performance liquid chromatography and size exclusion chromatography. dRIs are considered to be universal detectors because they can detect anything with a refractive index different from the solvent, but they have low sensitivity. When light leaves one material and enters another it bends, or refracts. The refractive index of a material is a measure of how much light bends when it enters.

A differential refractive index detector contain a flow cell with the following two parts: one for the sample; and one for the reference solvent. The dRI measures the refractive index of both components. When only solvent is passing through the sample component, the measured refractive index of both components is the same, but when an analyte passes through the flow cell, the two measured refractive indices are different. The difference appears as a peak in the chromatogram. Differential refractive index detectors are often used for the analysis of polymer samples in size exclusion chromatography. A dRI could output a concentration detector signal value corresponding to a concentration value of a sample.

dRI instruments, which measure small changes in refractive index of a solution, are highly desirable for measuring analyte concentration in solutions (e.g., in a chromatographic or FFF separation). dRI instruments are commonly used for isocratic chromatography, where the solvent is constant, and therefore has a constant refractive index, throughout the separation. Since dRI measurement does not require the analyte to contain chromophores or fluorophores, dRI measurement is suitable for a very wide range of molecular or macromolecular analytes including dissolved salts, polysaccharides, synthetic polymers, proteins, nucleic acids, lipids and more. dRI measurement offers a very wide range of concentration measurements, from ng/mL to g/mL.

dRI measurement involves measuring the difference in refractive index between (a) the solution containing solvent and analyte, located in the sample cell, and (b) the solvent alone located in the reference cell. The solution in the sample cell is usually changing (e.g., as eluent flows from a chromatographic separation system or another source of sample solution, the quantity of dissolved analyte changes). The solvent in the reference cell is not changed in the course of the measurement. Hence if, in the sample cell, the solvent is constant and only the analyte concentration changes, as in an isocratic separation, dRI provides a signal proportional to the analyte concentration.

Gradient Chromatography

Gradient chromatography involves mixing two solutions to provide a series of mobile phases that enhance macromolecular separation. Typically the different mixtures have different refractive indices, leading to large changes in dRI signals, which leads to error in analyte concentration measurement or even obscuration of the analyte dRI signal. Commonly, macromolecules such as proteins or polysaccharides are separated by gradient chromatography.

Current Technologies

Current technologies, as depicted in FIG. 1A, FIG. 1B, FIG. 1C, and FIG. 1D, depict how, if the solvent in the sample cell is also changing (e.g., as in a gradient chromatography such as ion-exchange chromatography (changing salt concentration) or reverse-phase chromatography (changing ratio between polar and non-polar solvent)), dRI provides a signal proportional to both the analyte concentration and changing solvent composition, which is not useful for determining analyte concentration. Thus, there is a need a differential refractometer for gradient chromatography.

Figure 1A:
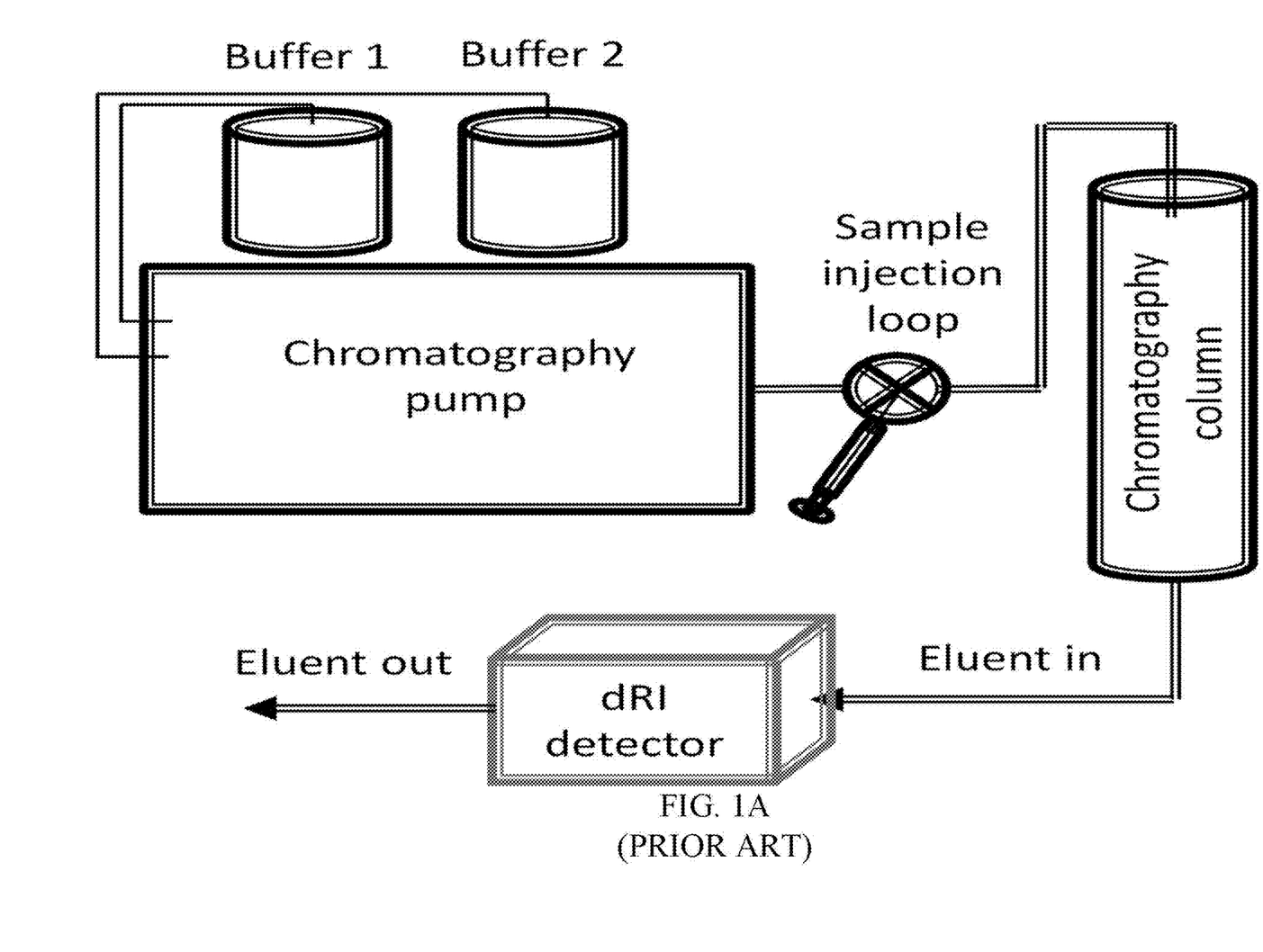
FIG. 1A depicts an existing differential refractometer.
Figure 1B:
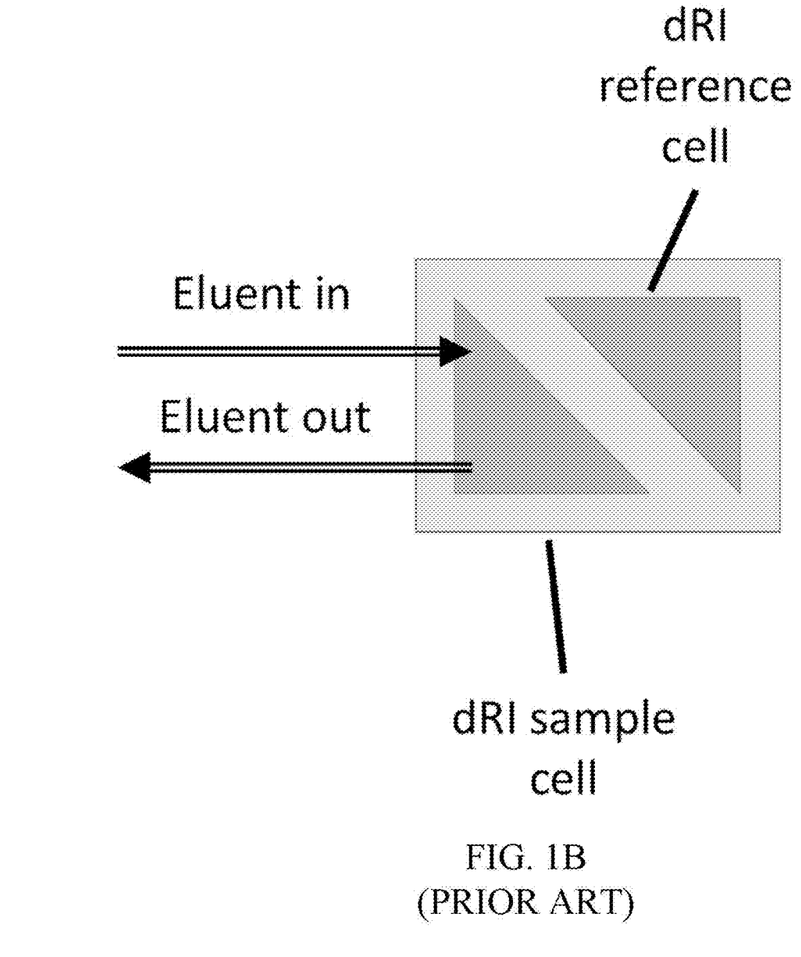
FIG. 1B depicts an existing sample cell of a differential refractometer.
Figure 1C:
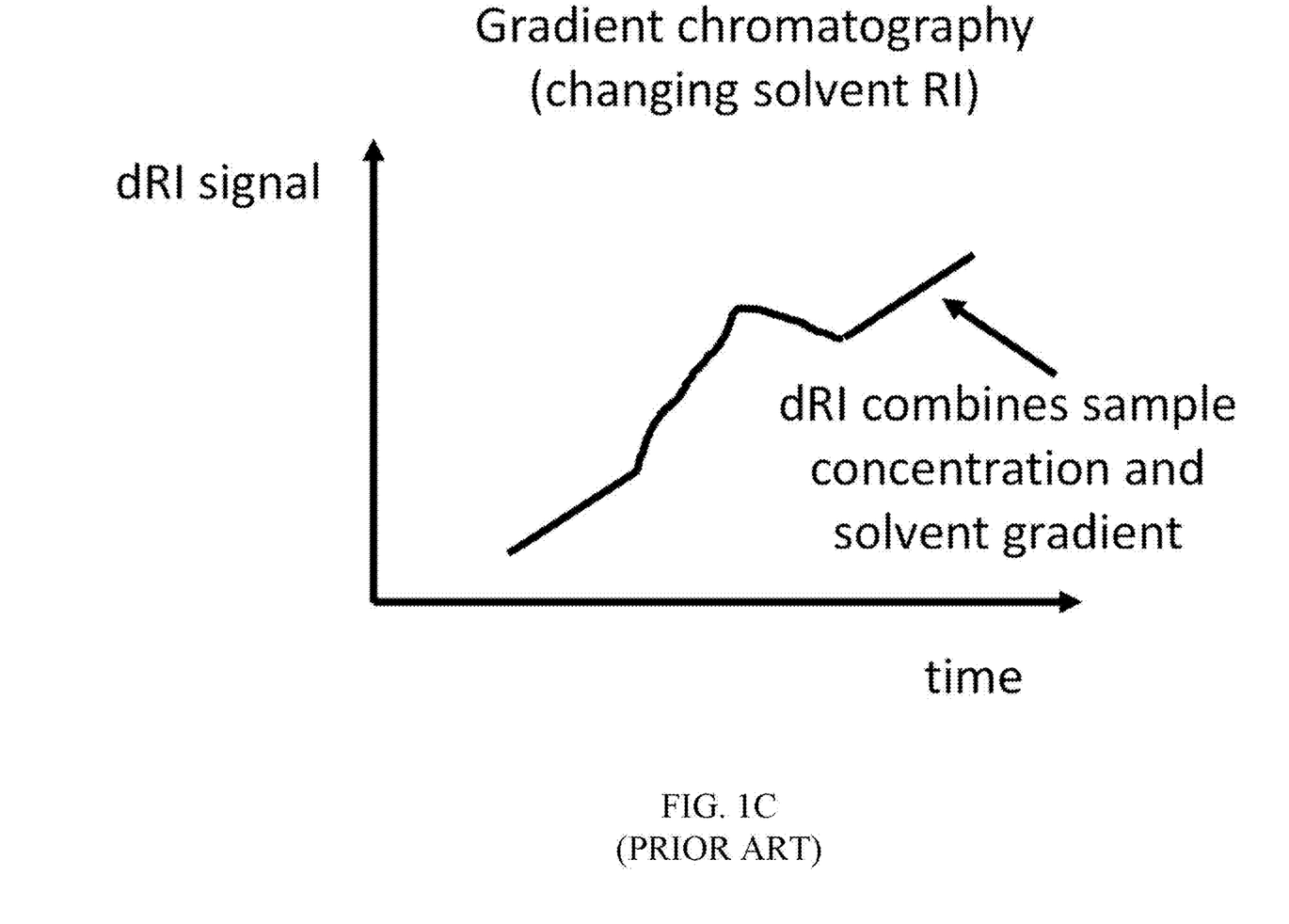
FIG. 1C depicts a graph in accordance with an existing differential refractometer.
Figure 1D:
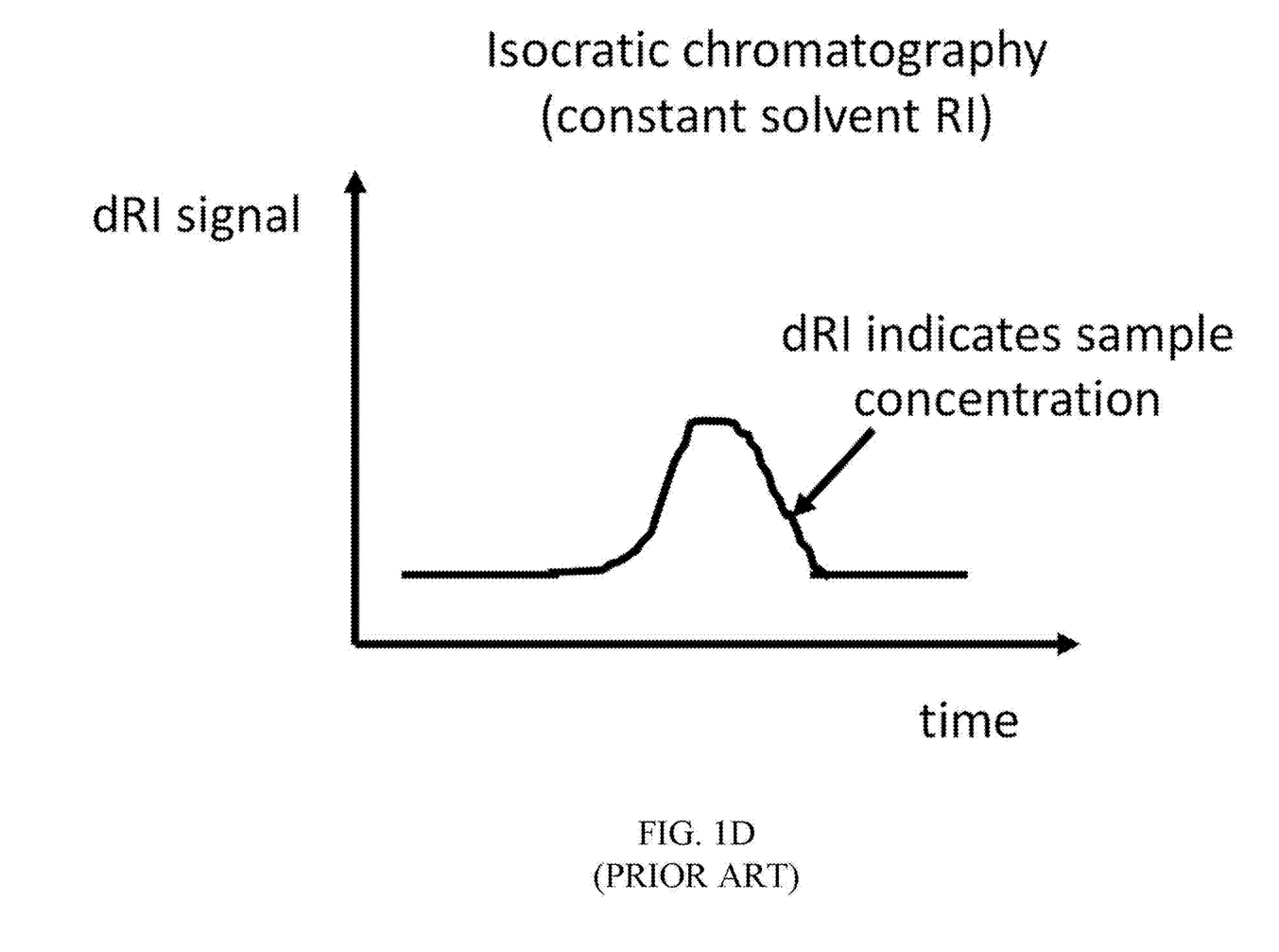
FIG. 1D depicts a graph in accordance with an existing differential refractometer.
Figure 2:
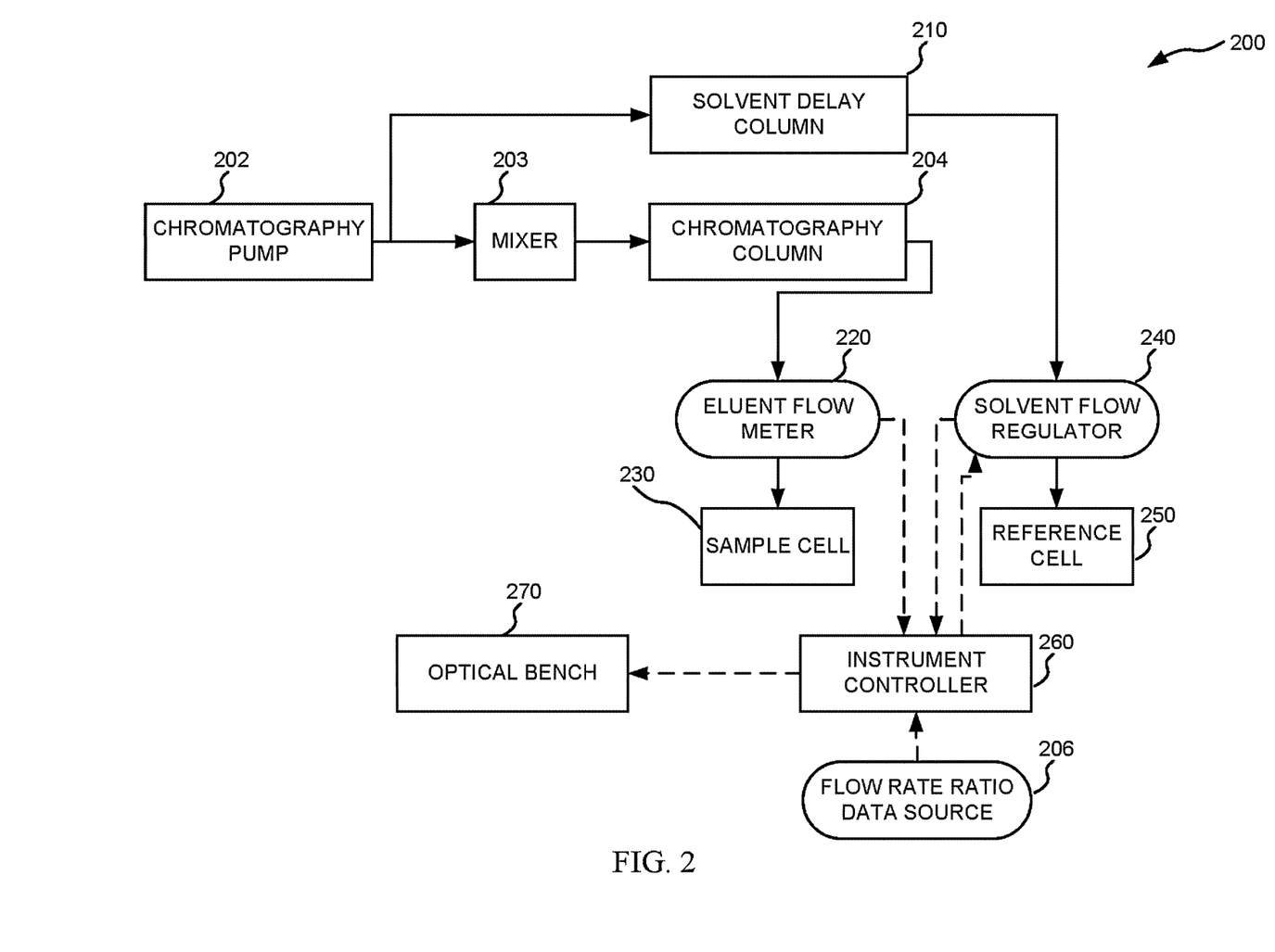
FIG. 2 depicts a differential refractometer in accordance with an exemplary embodiment.

Referring to FIG. 2, in an exemplary embodiment, the differential refractometer includes (1) a solvent delay volume 210 configured to be coupled to an outlet of a chromatography pump 202, (2) an eluent flow meter 220 configured to be coupled to an outlet of a chromatography column 204 and coupled to an eluent inlet of a sample cell 230, where eluent flow meter 220 is configured to measure an eluent flow rate of an eluent flowing through sample cell 230, (3) a solvent flow regulator 240 coupled to an outlet of solvent delay volume 210 and coupled to a solvent inlet of a reference cell 250, where solvent flow regulator 240 is configured to measure and to regulate a solvent flow rate of a solvent flowing through reference cell 250, (4) an instrument controller 260 configured to receive the eluent flow rate from eluent flow meter 220, configured to receive the solvent flow rate from solvent flow regulator 240, configured to receive a flow rate ratio from a flow rate ratio data source 206, wherein the flow rate ratio indicates a ratio of the eluent flow rate to the solvent flow rate, and configured to transmit a flow command to solvent flow regulator 240 to achieve the flow rate ratio, and (5) an optical bench 270 configured to measure, in response to receiving from instrument controller 260 a signal indicating that the flow rate ratio has been achieved, a difference between a refractive index of the eluent present in sample cell 230 and a refractive index of the solvent present in reference cell 250.

In an embodiment, the flow rate ratio is a ratio of a volume of a void in chromatography column 204 to a volume of a void in solvent delay column 210. In an embodiment, the flow rate ratio is a ratio of a sum of a volume of a void in chromatography column 204, a volume of tubing coupled to chromatography column 204, and a volume of eluent flow meter 220, to a sum of a volume of a void in solvent delay column 210, a volume of tubing coupled to solvent delay column 210, and a volume of solvent flow regulator 240.

Figure 3A:
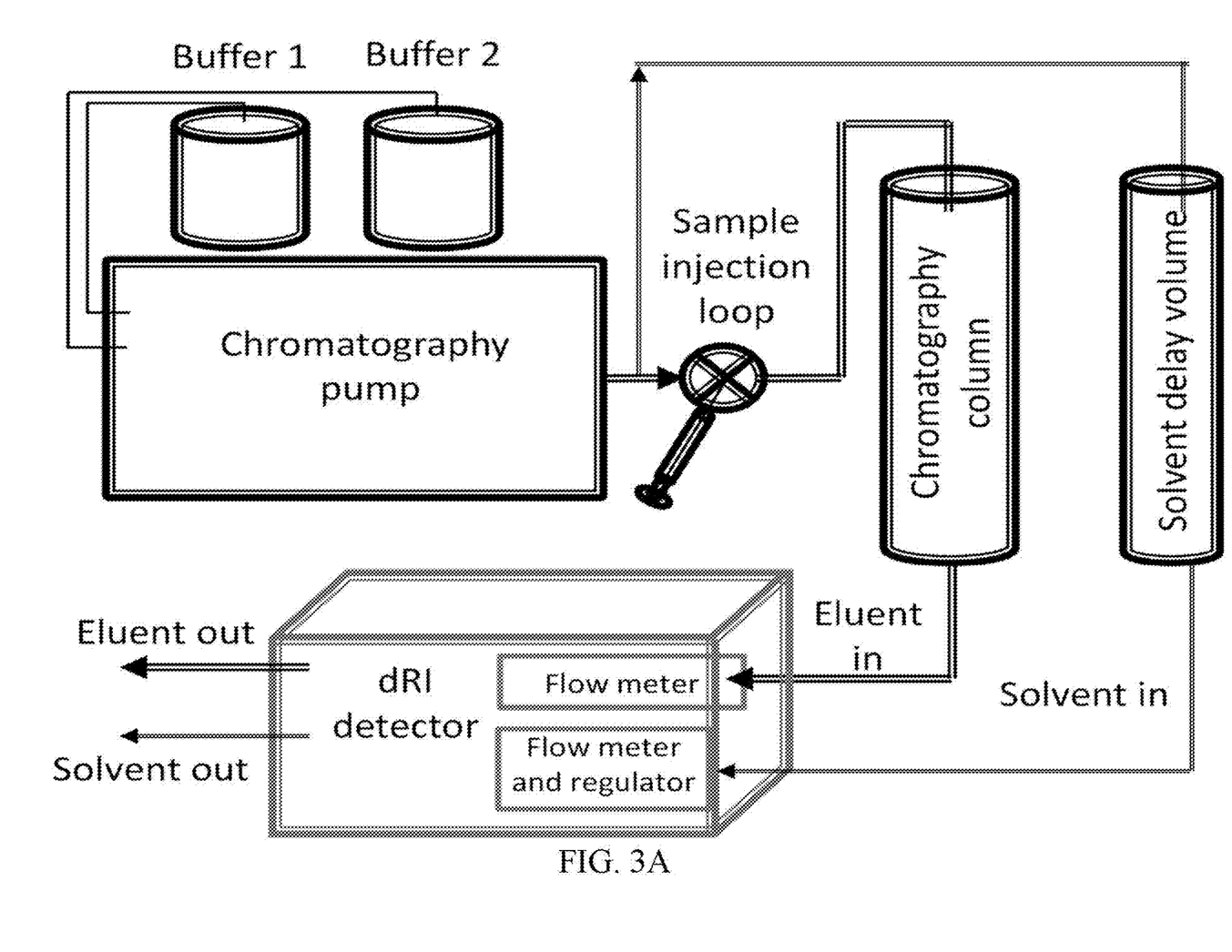
FIG. 3A depicts a differential refractometer in accordance with an embodiment.
Figure 3B:
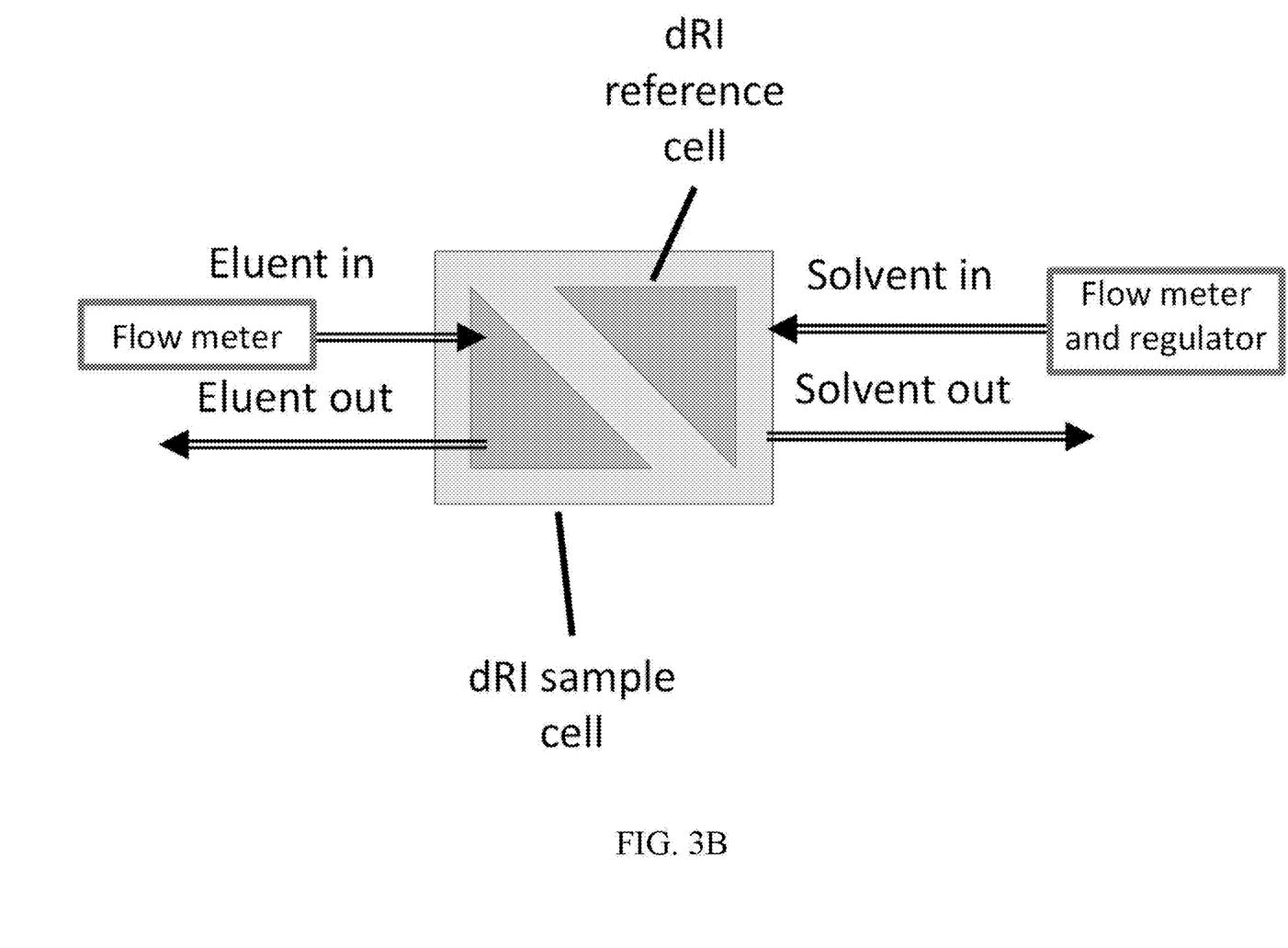
FIG. 3B depicts a sample cell of a differential refractometer in accordance with an embodiment.

FIG. 3A depicts a differential refractometer in accordance with an embodiment. FIG. 3B depicts a sample cell of a differential refractometer in accordance with an embodiment.

Figure 5:
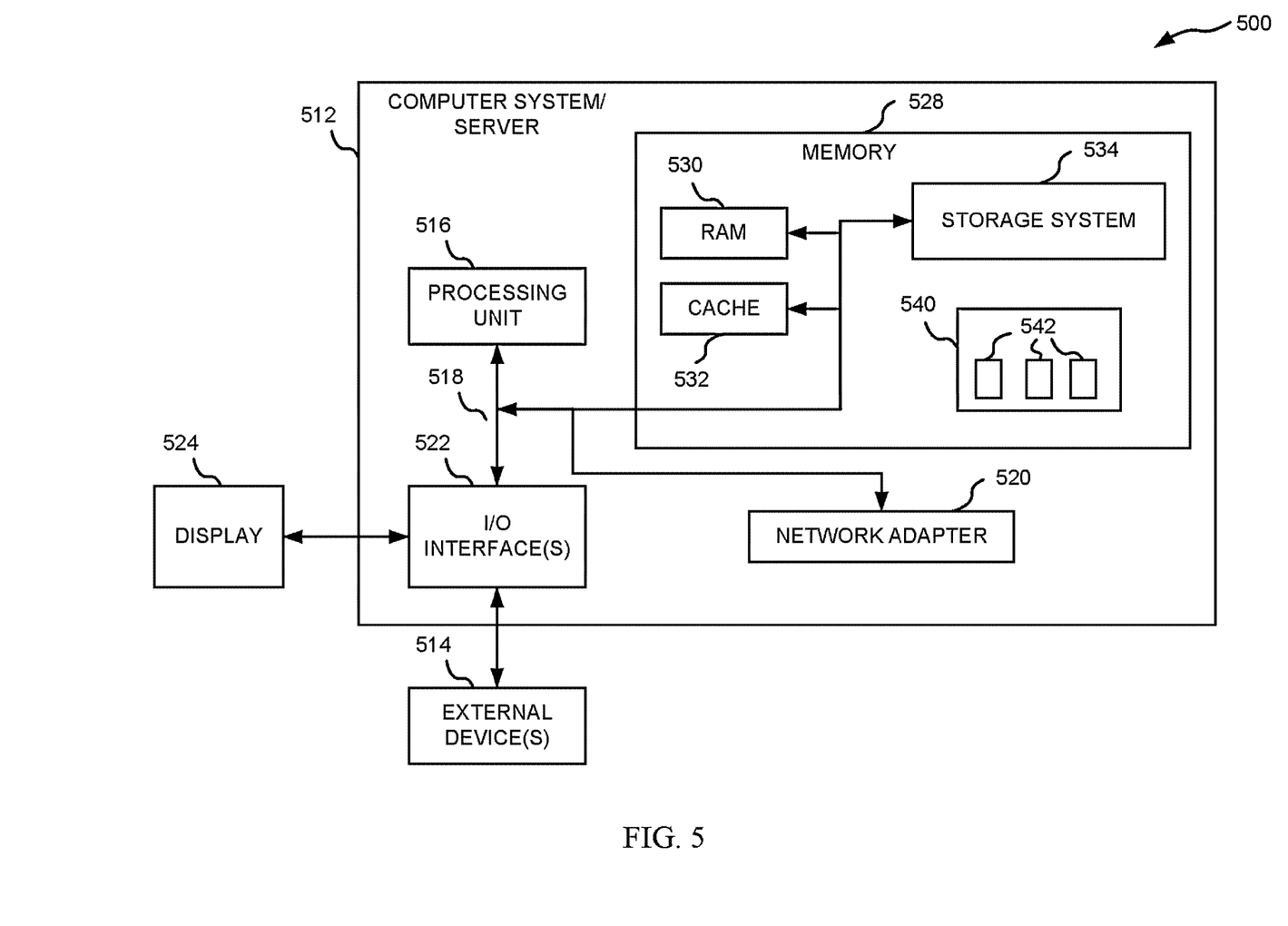
FIG. 5 depicts a computer system in accordance with an exemplary embodiment.

In an exemplary embodiment, instrument controller 260 is a standalone computer system, such as computer system 500 shown in FIG. 5, a network of distributed computers, where at least some of the computers are computer systems such as computer system 500 shown in FIG. 5, or a cloud computing node server, such as computer system 500 shown in FIG. 5. In an embodiment, instrument controller 260 is a computer system 500 as shown in FIG. 5, that executes a differential refractometer for gradient chromatography script or computer software application that carries out the operations of at least a method carried out by instrument controller 260. In an embodiment, instrument controller 260 is a computer system/server 512 as shown in FIG. 5, that executes a differential refractometer for gradient chromatography script or computer software application that carries out the operations of at least a method carried out by instrument controller 260. In an embodiment, instrument controller 260 is a processing unit 516 as shown in FIG. 5, that executes a differential refractometer for gradient chromatography script or computer software application that carries out the operations of at least a method carried out by instrument controller 260.

For example, reference cell 250 is provided with a changing solvent, matched to the changing solvent in sample cell 230 by splitting the flow emerging from the solvent mixing device, mixer 203, prior to its entering the sample loop, sending one portion to reference cell 250 and the remainder to continue within the chromatography system passing through the sample loop and separation column, chromatography column 204, before entering the dRI instrument's sample cell 230. In a further example, the portion of solvent destined for the dRI instrument's reference cell 250 passes through a delay volume, solvent delay volume 210, thereby inducing a timing delay equivalent to the delay experienced, upon passage through the chromatographic column, chromatography column 204, by the portion of solvent destined for sample cell 230. In this manner, for example, at each point in time, the same solvent composition would be present in sample cell 230 and reference cell 250, and the differential RI would be proportional only to the analyte concentration. In addition, for example, in order to maintain correct and constant flow rates through the chromatographic column, chromatography column 204, and the delay column, solvent delay column 210, a flow meter, eluent flow meter 220, is placed in-line with the chromatography flow path, and a flow regulator, solvent flow regulator 240, is placed in-line with the solvent delay flow path. For example, if solvent delay column 210 were to contain one tenth of the volume of chromatography column 204, the flow rate through solvent delay column 210 is maintained at one tenth of the flow rate though chromatography column 204.

Example

Figure 4A:
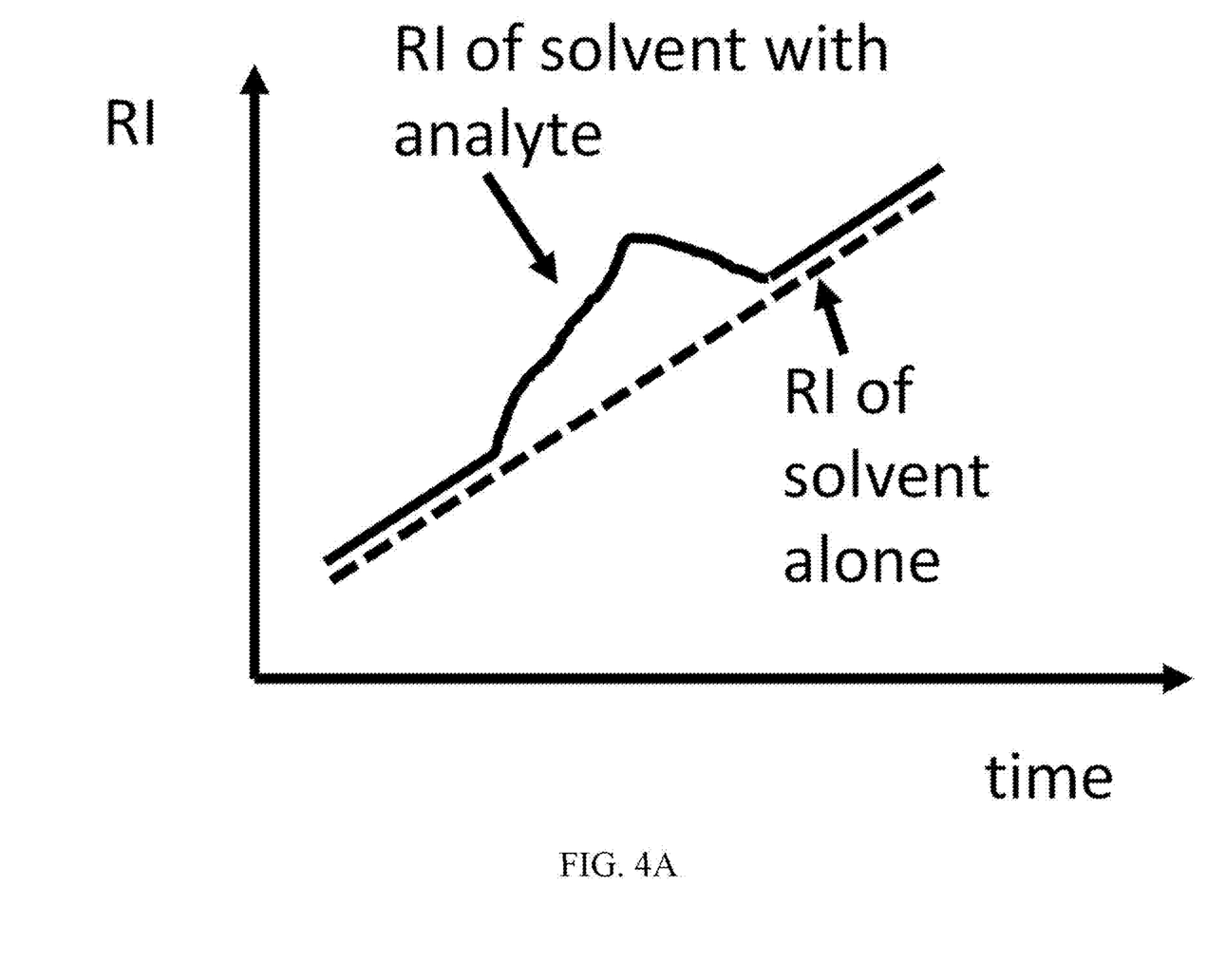
FIG. 4A depicts a graph in accordance with an embodiment.
Figure 4B:
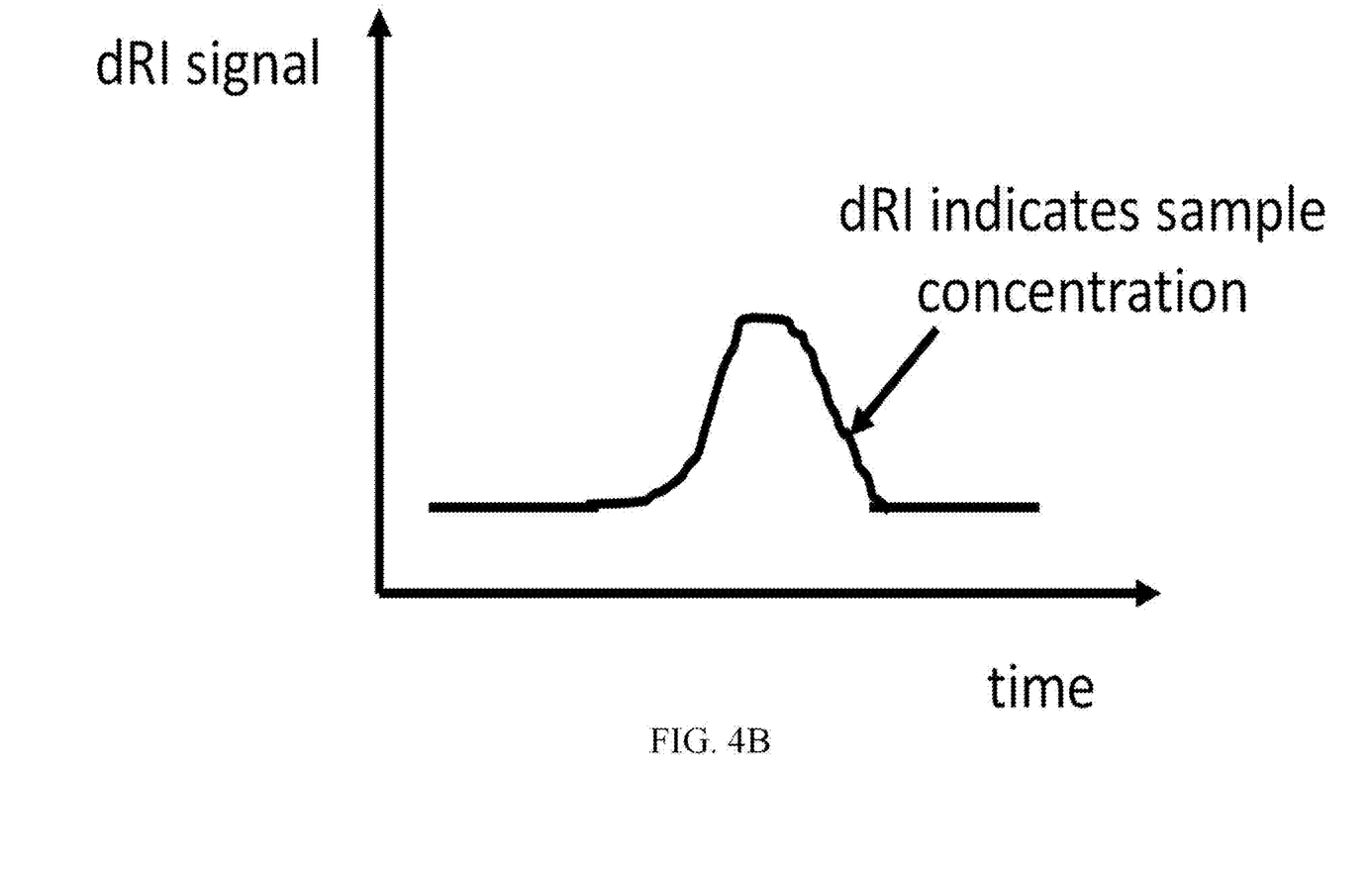
FIG. 4B depicts a graph in accordance with an embodiment.

For example, FIG. 4A and FIG. 4B depict how well the disclosed differential refractometer determines analyte concentration.

Computer System

In an exemplary embodiment, the computer system is a computer system 500 as shown in FIG. 5. Computer system 500 is only one example of a computer system and is not intended to suggest any limitation as to the scope of use or functionality of embodiments of the present invention. Regardless, computer system 500 is capable of being implemented to perform and/or performing any of the functionality/operations of the present invention.

Computer system 500 includes a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 512 may be described in the general context of computer system-executable instructions, such as program modules, being executed by a computer system. Generally, program modules may include routines, programs, objects, components, logic, and/or data structures that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computer system 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and includes both volatile and non-volatile media, removable and non-removable media.

System memory 528 can include computer system readable media in the form of volatile memory, such as random access memory (RAM) 530 and/or cache memory 532.

Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions/operations of embodiments of the invention.

Program/utility 540, having a set (at least one) of program modules 542, may be stored in memory 528 by way of example, and not limitation. Exemplary program modules 542 may include an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the present invention.

Computer system/server 512 may also communicate with one or more external devices 514 such as a keyboard, a pointing device, a display 524, one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A differential refractometer comprising:
  a solvent delay volume configured to be coupled to an outlet of a chromatography pump;
  an eluent flow meter configured to be coupled to an outlet of a chromatography column and coupled to an eluent inlet of a sample cell,
    wherein the eluent flow meter is configured to measure an eluent flow rate of an eluent flowing through the sample cell;
  a solvent flow regulator coupled to an outlet of the solvent delay volume and coupled to a solvent inlet of a reference cell,
    wherein the solvent flow regulator is configured to measure and to regulate a solvent flow rate of a solvent flowing through the reference cell; and
  an instrument controller
    configured to receive the eluent flow rate from the eluent flow meter,
    configured to receive the solvent flow rate from the solvent flow regulator,
    configured to receive a flow rate ratio from a flow rate ratio data source,
      wherein the flow rate ratio indicates a ratio of the eluent flow rate to the solvent flow rate, and
    configured to transmit a flow command to the solvent flow regulator to achieve the flow rate ratio.

2. The differential refractometer of claim 1 further comprising
  an optical bench configured to measure, in response to receiving from the instrument controller a signal indicating that the flow rate ratio has been achieved, a difference between a refractive index of the eluent present in the sample cell and a refractive index of the solvent present in the reference cell.

3. The differential refractometer of claim 2
  wherein the flow rate ratio is a ratio of a volume of a void in the chromatography column to a volume of a void in the solvent delay column.

4. The differential refractometer of claim 2
  wherein the flow rate ratio is a ratio of
    a sum of a volume of a void in the chromatography column, a volume of tubing coupled to the chromatography column, and a volume of the eluent flow meter, to
    a sum of a volume of a void in the solvent delay column, a volume of tubing coupled to the solvent delay column, and a volume of the solvent flow regulator.

* * * * *